United States Patent [19]
Grego et al.

[11] 3,775,154
[45] Nov. 27, 1973

[54] DECORATING GLASS-CERAMIC MATERIALS

[75] Inventors: Peter Grego, Wellsboro, Pa.; Joseph N. Panzarino, Big Flats, N.Y.

[73] Assignee: Corning Glass Works, Corning, N.Y.

[22] Filed: Aug. 12, 1971

[21] Appl. No.: 171,342

[52] U.S. Cl............................ 117/38, 65/33, 65/60, 106/39, 106/70, 117/37, 117/124
[51] Int. Cl........................ C03c 21/00, C03c 17/26
[58] Field of Search .................... 65/30, 33, 60, 31; 117/37 R, 124 A, 124 B, 124 C, 125, 40, 38; 106/70, 39, 34; 252/514; 161/196

[56] References Cited
UNITED STATES PATENTS

| | | | |
|---|---|---|---|
| 3,511,681 | 5/1970 | Huey, Jr. | 117/45 |
| 3,528,847 | 9/1970 | Grego et al. | 106/39 DV |
| 3,313,644 | 4/1967 | Morrissey | 65/30 |
| 2,662,035 | 12/1953 | Levi | 117/54 |
| 2,658,837 | 11/1953 | Blackman | 65/60 |
| 2,701,215 | 2/1955 | Kroeck | 117/124 C |
| 3,418,156 | 12/1968 | Medert et al. | 117/124 A |

Primary Examiner—Alfred L. Leavitt
Assistant Examiner—Frank Frisenda
Attorney—Clarence R. Patty, Jr. et al.

[57] ABSTRACT

This invention relates to a method of decorating glass-ceramics by an ion-exchange staining method wherein a composition consisting essentially of silver salts, transition metal compounds, sulfur and bentonite is applied to the glass prior to ceramming, and the glass is subsequently decorated and converted to a glass-ceramic in a single heat treating operating involving a hold at temperatures of at least about 1,100°C.

3 Claims, No Drawings

DECORATING GLASS-CERAMIC MATERIALS

BACKGROUND OF THE INVENTION

Since the invention of glass-ceramic materials by Stookey, as disclosed in U. S. Pat. No. 2,920,971, and the subsequent development of such materials for use in the manufacture of culinary ware, much attention has been directed to the difficult problem of decorating glass-ceramic articles. Initial approaches to this problem involved the use of glassy coatings such as ceramic glazes. However, glass-ceramics which are suitable for culinary ware have exceptionally low thermal expansivity, with coefficients of thermal expansion ranging from about $0-30 \times 10^{-7}/°C.$, and thus do not lend themselves to decoration with conventional high-expansion glazes on account of the mismatch of expansion coefficients. An appreciable expansion mismatch usually causes crazing or spalling of the glaze within a short period of time.

More recently, attempts to solve the problem of glass-ceramic decoration have involved staining processes wherein the glass-ceramic itself is colored. Coloration by such methods avoids the problem of expansion mismatch presented by glassy coatings, and additionally provides much more durable decoration. However, because of the semicrystalline nature of the glass-ceramic material, it has been suggested that traditional glass-staining or coloring pastes are not generally effective to produce acceptable coloration in highly crystalline glass-ceramics, presumably because the alkali-metal ions which would normally take part in ion-exchange coloration are tied up in the crystalline phase of the material. Accordingly, new decorating procedures involving either ion-exchanging or solid state reactions with the microcrystals in the glass have been developed.

One useful glass-ceramic decorating procedure is disclosed in U.S. Pat. No. 3,528,847. That procedure comprises coating a finished glass-ceramic article with a paste consisting essentially of at least one coloring ion selected from the group consisting of copper, gold, mercury, silver, and thallium, at least one diluent selected from the group consisting of $Al_2O_3$, $TiO_2$, and $ZrO_2$, a plasticizer and a wetting agent, and thereafter heating the coated glass-ceramic article to a temperature between about 500°–850°C. for a period of time sufficient to produce the desired color. That procedure is said to involve an ion-exchange reaction between the coloring ions and alkali-metal ions, wherein the coloring ions entering the glass-ceramic exchange with alkali-metal ions both in the glassy matrix and in the microcrystals contained therein. The process is expressly limited in application to alkali-metal-ion-containing glass-ceramics which have been previously crystallized at temperatures in excess of 850°C., and thus it disadvantageously requires a heat treatment subsequent to the ceramming operation. Other disadvantages include a rather strong dependence of color on both the ceramming treatment used to crystallize the glass-ceramic substrate and the firing treatment used to produce the stain coloring thereon, which makes control of the color obtained in the finished product difficult.

A second decorating procedure developed specifically for glass-ceramics is described in U.S. Pat. No. 3,313,644. That procedure comprises applying to the glass prior to controlled crystallization a composition consisting essentially of a glass coloring agent selected from the group consisting of iron, cobalt, nickel, and compounds thereof, and then crystallizing the body according to a heat-treating schedule wherein the glass is heated at some point to a temperature between about 900°–1,175°C. and held there for about 1–4 hours. It is suggested that the coloration produced by this treatment results from the diffusion of cobalt, iron, and/or nickel metal ions into the glass and the incorporation of these ions into the developing crystals of the glass-ceramic through a solid state reaction which occurs only at the prescribed elevated temperatures. The patented process is advantageous in that it permits decoration during the crystallizing operation, thereby avoiding the expense involved in a separate decoration heat treatment. However, it also involves serious disadvantages in that it normally produces a matte rather than a smooth finish which is susceptable to metal marking in normal usage. Furthermore, it has been found that the color produced by the patented method is altered by even mild polishing employed to remove residues after heat treatment, so that uneven or discontinuous coloration often results.

It is accordingly the principal object of the present invention to provide an improved method of decorating certain glass-ceramics which can be employed during the ceramming schedule to provide a broad range of attractive and durable colors which are not susceptible to change during post-crystallization polishing operations.

It is a further object of the present invention to provide decorations which, in addition to being an integral part of the glass-ceramic substrate, are of such improved surface quality as to be very nearly the equivalent of the glass-ceramic substrate in resistance to metal marking, scuffing, and abrasion.

Other objects and advantages of the invention will become apparent from the following detailed description and from the examples illustrating certain preferred specific embodiments thereof.

SUMMARY OF THE INVENTION

Our novel decorating procedure comprises preparing a composition consisting essentially, in weight percent, of about 5–15 percent of silver compounds, 5–15 percent of elemental sulfur, 40–80 percent of compounds of transition metals selected from the group consisting of iron, manganese, nickel, vanadium, chromium, titanium, and cobalt, and a total of 5–10 percent of binders, applying the composition in the form of a powder, paste, slurry, or spray to a thermally-crystallizable glass article to be decorated, and heating the article to a temperature at least above about 1,085°C. for a time sufficient to achieve the desired coloration. Preferably, the composition it applied to "green" or uncerammed glass and the heating step is carried out as one stage of the crystallizing process, so that both decorating and ceramming may be accomplished in a single heat-treating operation. The resulting colors are intense and deeply penetrating, with penetrations on the order of about 50 to 200 microns being common. They are also smooth, exhibiting a durability, toughness, and resistance to metal-marking equivalent to that of undecorated glass-ceramic materials. And, finally, because of the depth and durability of the color, the decorated glass-ceramics may be subjected to post-heat treatment polishing procedures without affecting the saturation of the color.

DESCRIPTION OF THE PREFERRED EMBODIMENTS

The decorating compositions of the invention employ in novel combination certain constituents used in the prior art to stain glasses and, more recently, to decorate glass-ceramics which have been transformed to the semicrystalline state prior to the decorating treatment. While the cooperative function of the various constituents in our compositions is not completely understood, it is believed that a silver-for-alkali metal ion-exchange plays an important role assisting in the development of the desired coloration. However, it is also fairly certain that the effectiveness of the invention does not depend on ion-exchange coloration alone, but is critically dependent on the presence of at least one of the disclosed iron, manganese, nickel, vanadium, chromium, or cobalt transition metal compounds, and upon the employment of a heat treatment at temperatures in the vicinity of 1,100°C. to 1,150°C. At temperatures between about 600°–1,050°C., and possibly above, the $Ag^+$ for alkali-metal ion-exchange between the glass or glass-ceramic and the staining composition is believed to proceed in the known manner, with the subsequent reduction of $Ag^+$ to $Ag^0$ giving rise to color centers in the glass. However, in the absence of certain other active diluents known to the art, this ion-exchange effect produces a very weak color in glass-ceramics, which is not of any significant commercial value.

Surprisingly, we have found that if at least one of the disclosed transition metal compounds is included in the decorating composition along with the silver compounds, and if the article to be decorated is then heated above a certain threshold temperature (about 1,100°C.), a sudden striking increase in the intensity of the color is produced. It is thought that this intense color is related to the commencement of diffusion by the transition metal ions into the glass-ceramic; however, the coloration is not strictly diffusion-controlled because increases in temperature above about 1,100°C. or in times beyond about 2 hours have been found to result in only slight increases in depth of color by comparison with the increase which suddenly occurs at the threshold temperature.

The choice of the transition metal compound or compounds to be incorporated into the decorating composition is determined according to the color desired in the finished product, and the composition of the glass-ceramic substrate. Iron oxide alone produces a bright yellow color after treatment; iron oxide plus manganese, nickel, and vanadium produce differing shades of brownish-yellow. Iron oxide with chromium provides cream tones and with cobalt provides gray to green. NiO alone provides grays, while $Co_3O_4$ alone provides blue. The exact compound of the transition metal employed is not critical since most of these compounds are acceptable source of diffusible ions at temperatures near 1,100°C. Generally, the readily available oxides, chlorides, and sulfates of these metals will be employed, including, for example, $Fe_2O_3$, $Fe_3O_4$, NiO, $NiCl_2$, $MnSO_4$, $Cr_2O_3$, $TiO_2$, and $Co_3O_4$.

The presence of a silver compound as a source of exchangeable silver ions is also critical in obtaining the objects of the present invention. It is not completely understood why the combination of exchangeable silver ions with diffusible transition metal ions should act to produce such intense colors at the threshold temperature; however, in the absence of silver compounds the colors obtained are not as durable as those obtained by the combined effects of ion exchange and diffusion. This effect was observed during the polishing of decorated glass-ceramic sheet after the crystallizing-decorating heat treatment to remove stain residue and minor surface defects incident to the manufacturing process, when it was observed that the colors obtained through the use of transition metal coloring agents alone suffered degradation as the result of the polishing treatment. This degradation takes the form of a color variation of the decorated area during polishing, so that decorations which appear suitable prior to polishing become discontinuous or irregular in color saturation as the result of the polishing treatment, rendering the decorated article unsuitable for sale. The use of the method of the present invention alleviates this problem, as will hereinafter more fully appear.

We have also found that the presence of a silver compound has a surprising effect on the surface quality of decorations produced according to the invention. Attempts at decorating with compositions not containing silver normally produce a matte finish on the treated areas of the glass-ceramic, whereas the addition of a silver compound results in a smooth and integral coloration. A matte finish is less desirable than a smooth finish for most decorations because it is much less resistant to scuffing, abrasion, and metal marking. Thus, the presence of at least one silver compound in the decorating composition is deemed critical to the invention.

The presence of sulfur in the decorating composition is important to the invention because it acts to prevent the premature reduction of the silver compounds. Refractory silver sulfides are formed, keeping the silver ions in the univalent state and, thus, available for ion exchange. Once in the substrate structure, the silver ion is reduced to the metallic state, where it acts as a non-diffusing, stable color center.

The preferred binder of our composition is bentonite. We have found that bentonite acts as a bonding agent during firing to insure good contact between the glass-ceramic and the decorating composition. This action is particularly critical with respect to the ion-exchange reaction, for which good contact is essential. The action is especially pronounced in water-based stain slurries. The bentonite also serves as a binder for the unfired decorating composition, providing the green strength necessary to preserve the integrity of the coating during handling prior to ceramming. Without bentonite additions, the green coating is friable and subject to chipping and scuffing. However, organic binders may be substituted for bentonite, if desired.

The results obtained through the use of our novel decorating compositions are improved if care is taken to insure thorough mixing of the batch materials prior to application. We have found that ball-milling the constituents is an effective way to achieve an intimate mixture. Conveniently, this ball-milling may be carried out with a mixture of the batch materials and water or alcohol, with the resultant slurry being readily adjustable by the addition of water or alcohol to the proper viscosity for spray application to the glass articles to be decorated. However, the method of mixing the batch constituents is not critical, so that any of the well-known mixing procedures may be employed, with the mixture then being applied in the form of a powder, paste, or slurry by any convenient method of application. It is preferred that coatings applied in the form of a paste or slurry be dried prior to subjecting the glass articles to ceramming, although this is not absolutely necessary. Coatings may also be applied by silk screen techniques using conventional squeegee oils with dried stain powder.

The ceramming schedule to which glasses coated with our novel decorating composition are subjected will have little effect on the final decoration as long as a final hold, preferably of at least about 2 hours at a temperature of at least about 1,100°C., is employed. Thus, the approach rates and holding temperatures to be used in the heating schedule may be chosen for the most part with regard only to glass-ceramic crystallization considerations, and will depend primarily on the composition of the glass to be cerammed and upon the properties required for the glass-ceramic end product.

As has previously been disclosed, the most critical stage in the development of coloration during the firing of our novel decorating compositions occurs at the threshold temperature, at which a sudden increase in the intensity of color is observed. Although this threshold usually occurs at about 1,100°C., so that holding times of sufficient length at this temperature will almost invariably produce intense, deep colors, we have found that some diffusion of transition metal ions may occur at temperatures as low as about 1,085°C., so that extremely long holding times at such temperatures, although not commercially practicable, could conceivably be employed to produce coloration with our compositions. The upper limits on firing temperature are generally imposed by the glass-ceramics to be decorated rather than by the decorating composition or process. Hence, we have found that firing temperatures up to the deformation temperatures of the glass-ceramic articles to be decorated may be employed. Normally, 1,200°C. represents the practical upper limit. From a commercial point of view, we prefer to employ temperatures in the vicinity of 1,100°–1,150°C. since these temperatures permit maximum exploitation of the threshold coloration effect within a reasonable period of time.

At temperatures between about 1,100°–1,150°C. the coloration approaches a saturation value within about 2 hours for all of the decorating compositions of the invention, and although longer treating times and higher temperatures can result in limited increases in color intensity, such increases are not considered worth the expense of longer, higher-temperature treatments. Holding times shorter than about an hour produce colors of markedly decreased intensity which are not particularly desirable from the commercial point of view. Following the firing of these decorating compositions onto the glass-ceramics to be decorated, a spray or screen residue remains which is removable by washing with water.

The method of the invention is limited in applicability to glass-ceramics which may be crystallized at temperatures in excess of 1,085°C., and which contain alkali-metal ions, since the silver-for-alkali-metal ion-exchange is critically important in attaining smooth and durable decorations of the desired colors. It is particularly useful, for example, in decorating lithium-containing glass-ceramics wherein betaspodumene constitutes the principal crystalline phase. Table I sets forth examples of compositions for glass-ceramics which may be decorated according to our novel method, as expressed in weight percent on the oxide basis as calculated from the batch.

TABLE I

|  | A | B | C | D | E |
|---|---|---|---|---|---|
| $SiO_2$ | 67.2 | 69.7 | 71.0 | 71.0 | 69.2 |
| $Al_2O_3$ | 20.5 | 17.9 | 18.0 | 18.0 | 20.5 |
| $Li_2O$ | 3.5 | 2.6 | 2.5 | 2.5 | 3.9 |
| ZnO | 1.2 | 1.0 | 1.0 | — | — |
| MgO | 1.6 | 2.8 | 3.0 | 4.0 | — |
| $TiO_2$ | 4.8 | 4.8 | 4.5 | 4.5 | 5.4 |
| $Na_2O$ | 0.3 | 0.3 | — | — | — |
| $K_2O$ | 0.15 | 0.1 | — | — | — |
| $Fe_2O_3$ | 0.04 | — | — | — | — |
| $As_2O_3$ | 0.5 | 0.9 | — | — | — |
| F | 0.2 | — | — | — | — |
| BaO | — | — | — | — | 1.0 |

The invention may be further understood by reference to the following numbered examples, which represent specific embodiments of the method of the invention:

EXAMPLE I

A glass of composition A of Table I was spray coated with a decorating composition consisting essentially, in weight percent, of 70% $Fe_2O_3$, 10% $AgNO_3$, 10 percent sulfur and 10 percent bentonite which had been mixed with water to form a slurry having a viscosity of about 1,300 centipoises. The slurry had been mixed in a ball mill for about 4 hours to obtain thorough mixing prior to application. The coated glass was then subjected to a ceramming schedule comprising heating to 800°C. at a rate of 400°C./hour, heating to 850°C. at a rate of 100°C./hour, heating to 1,100°C. at a rate of 400°C./hour, and holding at 1,100°C. for 2 hours. The glass-ceramic thus produced was finally washed to remove the residue from the decorating composition, and a saturated bright yellow color was observed. The surface was glossy and as durable as the undecorated areas.

EXAMPLE II

The criticality of the 2 hour hold at 1,100°C. was illustrated by a duplication of the procedure of Example I, with the exception that a 2 hour hold at 1,085°C. was substituted for the 2 hour hold at 1,100°C. An extremely pale yellow color, typical of the weak colors resulting from attempts to stain glass-ceramics using conventional low-temperature glass silver-staining techniques, was observed.

EXAMPLE III

Following the procedure of Example I, a composition consisting essentially, in weight percent, of 40% $Fe_2O_3$, 10% $AgNO_3$, 10 percent sulfur, 10 percent bentonite, and 30% $NiCl_2$ was applied in the form of a slurry to a glass of Composition A of Table I and cerammed to 1,100°C. with a 2 hour hold as described. Following cooling and residue removal, a dark gold decoration with good gloss and durability was observed.

Table II sets forth in general terms the kinds of colors available in glass-ceramics having a composition similar to composition A of Table I decorated according to the invention when various amounts of transition metal compounds are substituted for equal weights of $Fe_2O_3$ in the decorating composition of Example I:

TABLE II

| Composition | Color |
|---|---|
| Example I (70% $Fe_2O_3$) | bright yellow |

5-20% $Cr_2O_3$ for $Fe_2O_3$ — cream
5-30% $MnSO_4$ for $Fe_2O_3$ — light to medium tan
5-25% $Co_3O_4$ for $Fe_2O_3$ — green
10-30% $NiCl_2$ for $Fe_2O_3$ — cream to dark tan In all cases, decorations produced according to the method of the invention are deeply penetrating and extremely smooth; accordingly, they are of greatly improved durability by comparison with prior art glass-ceramic decorations.

EXAMPLE IV

The improved durability of the decorations described herein was demonstrated by a direct comparison of one type of prior art decoration with the decorations of the present invention. In making the comparison, two identical sheets of a thermally-crystallizable glass, each of composition B of Table I, were coated with decorating compositions suitable for use concurrently with the crystallizing heat treatment. Sample 1 was coated by silk-screening with a prior art transition metal decorating composition of the type described in U.S. Pat. No. 3,313,644, consisting essentially, in weight percent, of about 13.5% NiO and 1.6% $Fe_2O_3$ as transition metal coloring agents and 6.7% $Cr_2O_3$ and 78.2% $TiO_2$ as diluents, mixed with a conventional squeegee oil to form a heavy paste. Sample 2 was coated by silk-screening with a composition of the type disclosed herein, consisting essentially, in weight percent, of about 20% NiO, 5% $Cr_2O_3$, 7.5% $AgNO_3$, 5% S, and 62.5% $TiO_2$, also mixed with a conventional squeegee oil to form a heavy paste. Each sample was then subjected to a crystallizing heat treatment comprising heating to a temperature of 800°C. at a rate of 300°C. per hour and holding at 800°C. for 1 hour, and then heating to a temperature of about 1,150°C. at a rate of about 300°C. per hour and holding for 2 hours. Following this treatment, the sheets were cooled to room temperature and examined. It was determined that the heat treatment had converted the glass to a highly-crystalline glass-ceramic material, and that the decorating compositions had in each case imparted color the glass-ceramic material; however, the presence of a residue from the decorating compositions together with some minor surface defects in the glass-ceramic material arising out of the manufacturing process necessitated a final polishing treatment in each case. The required polishing was undertaken manually with an electrically-powered buffer and a commercially available polishing compound, the entire operation requiring not more than about 2-3 minutes per sheet. At the termination of the polishing treatment, the sheets were washed with water, dried and inspected to determine the quality of the decoration imparted by the compositions. A close inspection of the sheet decorated with the prior art composition revealed undesirable color variation and/or surface roughness in the decorated areas. The rough surface regions could be readily metal marked. The sheet decorated according to the present invention, on the other hand, was smooth and uniform in color, with the decorated areas demonstrating a resistance to metal marking as good as the glass-ceramic material itself. From the above description, it is readily apparent that method of the present invention provides a decoration of greatly improved durability, uniformity of color, and resistance to scuffing and marking when compared to prior art decorations produced from compositions consisting essentially of transition metals and diluents. Accordingly, the method of the present invention represents a useful advance in the art of decorating alkali-metal-containing glass-ceramic materials concurrently with the crystallizing operation.

We claim:

1. In a method for decorating an alkali-metal-containing glass-ceramic article concurrently with the crystallizing heat treatment which comprises the steps of applying to an alkali-metal-containing thermally-crystallizable glass article a decorating composition comprising transition metal colorants and thereafter heating said article to a temperature of at least about 1085°C. for a time at least sufficient to concurrently achieve the crystallization and coloration of said article, the improvement which comprises applying a decorating composition which consists essentially, in weight percent, of about 5-15% of silver compounds, 5-15 percent of elemental sulfur, 40-80 percent of transition metal compounds selected from the group consisting of compounds of iron, manganese, nickel, vanadium, chromium, titanium and cobalt, and 5-10 percent of binders.

2. A method according to claim 1 wherein the thermally-crystallizable glass article is heated to a temperature of at least about 1100°C. for a time at least sufficient to concurrently achieve the crystallization and coloration of said article.

3. A method according to claim 2 wherein said alkali-metal-containing thermally-crystallizable glass article contains lithium and is thermally crystallizable to a glass-ceramic article wherein the principal crystal phase is beta-spodumene.

* * * * *